Feb. 12, 1952 P. G. MUELLER 2,585,821
LIQUID MEASURING AND DISPENSING APPARATUS
Filed Oct. 17, 1949
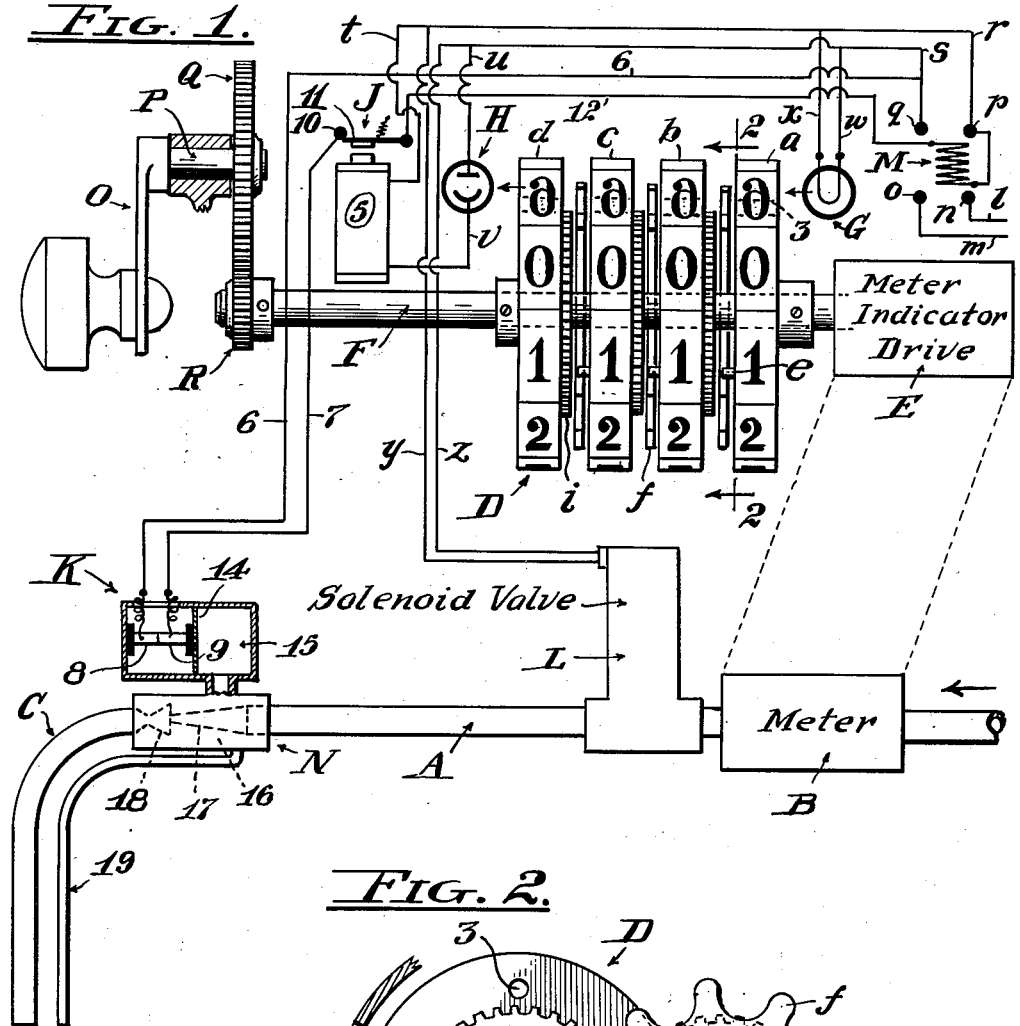
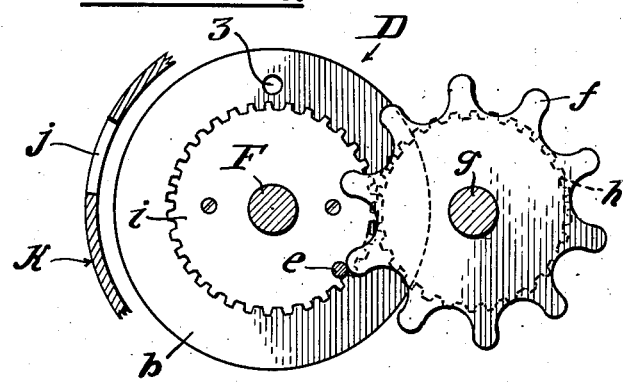
Inventor
Paul G. Mueller,
By R. S. Burd
Attorney Patented Feb. 12, 1952

2,585,821

UNITED STATES PATENT OFFICE 2,585,821

LIQUID MEASURING AND DISPENSING APPARATUS

Paul G. Mueller, Los Angeles, Calif.

Application October 17, 1949, Serial No. 121,793

1 Claim. (Cl. 222—20)

The invention resides in the provision of a measuring device associated with the indicator of a liquid meter whereby the indicator may be adjusted and set to designate any desired quantity of liquid to be metered and which will operate to automatically determine the flow of the liquid through a meter to effect dispensing of a measured volume of the liquid according to the adjustment of the indicator; the device being particularly applicable for use in the delivery of a selected predetermined amount of gasoline from a supply reservoir to the tank of a motor vehicle and especially in self service fuel supply stations.

An object of the invention is to provide an automatic shut-off for the gasoline dispensing apparatus of supply stations, that may be readily adjusted and set to deliver any desired quantity of gasoline without the aid of an attendant, who will thereby be left free to render various services during the time the gasoline is being delivered.

Another object is to provide an automatic liquid metering and dispensing device which is accurate in its operation and the use of which will obviate the possibility of dispensing either a short or an excessive measure of liquid as is commonly incident to manually controlled liquid dispensers.

A further object is to provide means operable in conjunction with the measuring device for preventing the overflow of a tank to which liquid is being delivered in event the measuring device is set to supply a quantity of liquid in excess of the capacity of the tank.

With the foregoing objects in view together with such other objects and advantages as may subsequently appear the invention resides in the parts and in the combination, construction and arrangement of parts as hereinafter described and claimed and illustrated by way of example in the accompanying drawings in which:

Fig. 1 is an elevational diagrammatic view of a liquid metering and dispensing apparatus showing the invention as applied; and Fig. 2 is a view in section and elevation taken on the line 2—2 of Fig. 1 as seen in the direction indicated by the arrows:

In the drawing A indicates a conduit leading through a meter B from any suitable source of supply of liquid to be dispensed, such as a gasoline supply tank; the conduit being fitted with a discharge nozzle C as is common in gasoline dispensing apparatus. The meter B is of conventional construction and embodies the usual indicator D actuated through ordinary driving mechanism E; the indicator embodying a series of disks of any suitable number carried on a drive shaft F actuated by the driving mechanism E. The indicator disks as here shown include an end disk $a$ which is fastened to the shaft F and a series of disks $b$, $c$ and $d$ loose on the shaft F to rotate relative thereto but held against longitudinal movement thereof. The disks $a$, $b$ and $c$ are each fitted with a pin $e$ arranged to move in and out of engagement with the teeth of a counter wheel $f$ (see Fig. 2) revolubly mounted on a fixed shaft $g$ which counter wheel carries a spur gear $h$ the teeth of which mesh with a complementary gear wheel $i$ on the adjacent following disks $b$, $c$ and $d$ as is common in meter indicators. The outer peripheries of the disks $a$, $b$, $c$ and $d$ are here shown as provided with numerical indicia consisting of "0" to "9" consecutively arranged and equally spaced around the circumference of the disks. The indicia may consist of monetary symbols to designate sums in dollars and cents or of other monetary systems as occasion may require. The indicia and the teeth of the counter wheel F correspond in number so that on rotation of any one of the disks a complete revolution, movement of its associated star wheel and indicator disk one position will be effected in the manner well known in indicating devices of this character.

Normally at the beginning of a metering operation the disks $a$, $b$, $c$ and $d$ are arranged with the ciphers thereon in alignment opposite a sight opening $j$ in a housing $k$, a fragmentary portion of which is shown in Fig. 2.

In carrying out the invention each of the several disks, $a$, $b$, $c$ and $d$ is provided with a lateral opening 3 arranged to align with the opening of an adjacent disk only when the contiguous disks are disposed with their ciper indicia in register and exposed through the sight opening $j$, whereby all of the openings 3 in the several disks will be aligned when the cipher indicia thereon are exposed in the reading position opposite the sight opening $j$.

Several electrical and electro-mechanical devices are employed in conjunction with the above recited elements to accomplish the purpose of the invention which embody an electric lamp G, a photoelectric cell H, a normally closed relay switch J, a normally closed circuit breaker K, a normally closed solenoid valve L on the conduit A, and a normally open control switch M. The electric lamp G is located at one end of the indicator disk assembly opposite the opening 3 in the disk $a$ when it is normally positioned, and the photo electric cell H is located adjacent the other end of the indicator disk assembly opposite the opening 3 in the disk d when it is normally positioned. By this arrangement on illuminating the lamp G when the openings 3 of the several indicator disks are in alignment a beam of light will be directed through the openings 3, and be impinged on the photoelectric cell H so as to condition the latter for the flow of electric current therethrough.

The photo-electric cell H controls the relay switch J which controls the flow of electric current through the circuit breaker K which in turn controls the solenoid valve L controlling the flow of liquid through the conduit A; the valve L being located on the conduit A between the meter B and the nozzle C.

The control switch M comprises a normally open magnetic switch adapted to be manually closed to direct electric current to the several specified electrically operated devices, and also to be automatically opened under the control of the circuit breaker K to cut off the electric current to such devices; the switch M embodying a solenoid coil 4 adapted when energized to maintain the switch closed and on being deenergized to allow the switch to automatically open as is common in control switches of this character.

The electric circuits employed are here shown as including conductors l and m leading from a source of electric current supply to a pair of terminals n and o of the normally open manually operable magnetic switch M, which also embodies a pair of terminals p and q from which lead main conductors r and s. Conductors t and u leading from the conductors r and s connect respectively with one terminal of the solenoid magnet 5 of the relay switch J and one terminal of the photoelectric cell H, the other terminals of which magnet and cell are interconnected by a conductor v. The photoelectric cell H and relay switch J are thus arranged in series whereby on closing the switch M the cell 5 will be placed in circuit so that when the cell is conditioned for the flow of current there through by the action of rays from the lamp G passing through the aligned holes 3 of the indicator disks, electrical current will be directed through the photoelectric cell H and through the coils of the magnet 5 of the relay switch J by way of conductors m, s, u, v, t, r and l. Conductors w and x lead from the conductors r and s respectively to the electric lamp G, and conductors y and z lead from the conductors r and s to the terminals of the usual coil embodied in the solenoid valve J. Conductors 6 and 7 lead from the normally closed contact members 8 and 9 of the circuit breaker K; conductor 6 leading to the contact member q of the control switch M, and conductor 7 leading to a contact member 10 of the relay J, the associated normally closed switch arm 11 of which is connected to a conductor 12 leading to one terminal of the coil M of the control switch M the other terminal of which connects with contact p of the control switch.

The contact member 9 of the circuit breaker K is carried on a diaphragm 14 formed in one wall of a vacuum chamber 15 provided in the housing of the circuit breaker which vacuum chamber opens to a chamber 16 embodied in an ejector N arranged in the conduit A at the base of the nozzle C. The ejector N is of conventional construction adapted to induce negative pressure or create a partial vacuum while liquid is flowing therethrough, it embodying a nozzle 17 on the outer end of the conduit and a restricted throat 18 at the inner end of the nozzle C into which a jet of the liquid flowing through the conduit A is projected; the nozzle 17 and throat 18 being disposed in the chamber 16.

Leading from the ejector chamber 16 is a tube 19 the outer end of which opens adjacent the discharge end of the nozzle C and is adapted to be submerged in liquid in a reservoir being supplied through the nozzle C. When the tube 19 is open to atmosphere the ejector N will create little or no negative pressure in the chambers 15 and 16; the ejector being designed to create negative pressure in the chamber 15 sufficient to influence the diaphragm 14 only when the tube 19 is closed to atmosphere.

Means are provided for manually turning the indicator shaft F to dispose the disks thereon out of their normal position with the holes 3 therein out of alignment with each other, and to position the disks to indicate an amount of liquid to be delivered. This means is here shown as embodying a hand crank O on a shaft P carrying a gear wheel Q meshing with a gear wheel R on the shaft F.

In the operation of the invention the indicator disks are disposed in their desired position by turning the shaft F in a direction opposite that effected by the indicator drive so as to align the required indicia in the sight opening j and at the same time dispose the holes 3 in the disks out of alignment. Thereafter, on closing the switch M, electrical current will flow through the lamp G by way of the conductors m, s, w, x, r and l, thereby illuminating the lamp in readiness for projection of a beam of light through the holes 3 onto the photo-electric cell H when the disks are returned to their normal position by the meter driving mechanism; the indicia on the disks being arranged in reverse order to that ordinarily employed on metering devices so that the indicator when operated by its drive will run from an amount indicated thereon back toward the normal position.

On closing the switch M electric current will flow through the circuit breaker K by way of conductor m, switch M, conductor 6, contacts 8—9, conductor 7, switch arm 11, conductor 12, magnet coil 4, switch M and conductor l, thus energizing the magnet coil 4 which will act to hold the control switch M in its closed position.

On closing the switch M electrical current will be directed through the coils of the solenoid valve L by way of switch M through conductors m, s, z, y, r, and l, thereby actuating the solenoid valve to effect opening thereof so that liquid will then flow from the meter B through the conduit A, ejector N and nozzle C. The meter B will be actuated and will operate in the customary manner through the indicator drive E to rotate the shaft F and thereby effect rotation of the indicator disks in their consecutive order until the disks previously set to indicate the selected amount of liquid to be dispensed have been restored to normal, that is, in the cipher position wherein the holes 3 of the several indicator disks will be aligned with each other and form a window through the disk assembly so that a beam of light will be projected from the lamp G through such window onto the photo-electric cell H which will thereby be conditioned so that electrical current will pass therethrough and through the coils of the magnet 5 of the relay switch J as before described; the current flowing through conductors m, switch M, conductors s and u, cell H, conductor $v$, magnet 5, conductors $t$ and $r$, switch M and conductor $l$.

The electrical current on passing through the coils of the magnet 5 energizes the latter thereby causing it to swing the switch arm 11 out of contact with the contact member 10 thus breaking circuit through the coil of the magnet coil 4 and deenergizing the latter whereupon the control switch M will automatically open thereby cutting off the flow of current to the coil of the solenoid valve L and causing the latter to close and shut off the flow of liquid through the conduit A and nozzle C. A predetermined measured volume of liquid will thus be dispensed.

In event that during the dispensing of the liquid the tank to which it is being delivered should be filled to a point near overflow, the outer end of the tube 19 will become submerged in the liquid in the tank, since the nozzle C and the tube 19 will be extended into the tank. When this occurs the flow of liquid through the ejector N will create a partial vacuum or negative pressure in the chamber 15 whereupon atmospheric pressure on the outer side of the diaphragm 14 will flex the latter so as to move the contact 9 away from the contact 8 thereby breaking the circuit through conductors 6, 7 and 12 whereupon the magnet 4 will be deenergized, switch M will open and the solenoid valve L will close. The flow of liquid through the conduit A will thus be automatically terminated so as to prevent overflow of a tank to which it is being supplied.

While I have shown and described a specific embodiment of my invention, I do not limit myself to the exact details of construction set forth, and the invention embraces such changes, modifications and equivalents of the parts and their formation and arrangement as come within the purview of the appended claim.

I claim:

In a fluid measuring apparatus, the combination with a fluid conduit, a meter connected to said conduit for measuring fluid passing therethrough, a series of indicating disks embodied in and operable by said meter bearing measuring indicia each having a hole therethrough arranged to align with the holes of the other disks when the disks are in a normal position, means for rotating said disks to various selected positions to expose indicia thereon to designate an amount to be measured, a normally closed solenoid valve in said conduit, a normally open magnetic control switch, electric current conductors leading from said solenoid valve and connecting with a source of electrical supply through said switch when the latter is closed, an electric magnet embodied in said switch operable when energized to hold said switch closed, a normally closed relay switch, electric conductors connecting said control switch and said relay switch, a photo-electric cell in said conductors arranged to receive a beam of light projected through the holes in said disks when in their normal position, and an electric lamp arranged to project a beam of light through said holes; said photo-electric cell when energized directing electric current to said relay switch to open same and thereby deenergize the magnet of said control switch to open the latter; a nozzle on said conduit, an ejector in said conduit, a vacuum chamber connected to said ejector, a tube opening to said chamber having an open end adjacent said nozzle adapted to be closed by liquid in which said nozzle is submerged, a normally closed circuit breaker in the conductors connecting said relay switch and the magnet of the control switch, and means influenced by partial vacuum in said vacuum chamber for opening said circuit breaker.

PAUL G. MUELLER.

REFERENCES CITED

The following references are of record in the file of this patent:

UNITED STATES PATENTS

| Number | Name | Date |
|---|---|---|
| 1,775,293 | Pfening et al. | Sept. 9, 1930 |
| 2,275,331 | Wickerly | Mar. 3, 1942 |